United States Patent [19]

Krupick et al.

[11] 4,454,777
[45] Jun. 19, 1984

[54] FLEXURE SUSPENDED GYRO UTILIZING DUAL SALIENT POLE MAGNETS

[75] Inventors: Walter J. Krupick, Succasunna; Peter L. Previte, Wayne; Richard F. Cimera, Fairfield, all of N.J.

[73] Assignee: The Singer Company, Little Falls, N.J.

[21] Appl. No.: 312,609

[22] Filed: Oct. 19, 1981

[51] Int. Cl.³ ...................... G01C 19/28; G01C 19/30
[52] U.S. Cl. .................................. 74/5.46; 74/5.6 E
[58] Field of Search ................ 74/5.46, 5.47, 5.6 E, 74/5 F

[56] References Cited

U.S. PATENT DOCUMENTS

| Re. 30,290 | 6/1980 | Craig et al. | 74/5 F X |
|---|---|---|---|
| 3,327,541 | 6/1967 | Clark et al. | 74/5.46 |
| 3,438,270 | 4/1969 | Binder et al. | 74/5.6 E X |
| 3,452,609 | 7/1969 | Goodhue et al. | 74/5.6 E |
| 3,557,629 | 1/1971 | Quermann | 74/5 F X |
| 3,678,764 | 7/1972 | Erdley et al. | 74/5 F |
| 3,832,906 | 9/1974 | Craig | 74/5 F |
| 4,290,316 | 9/1981 | Noar et al. | 74/5.6 E X |
| 4,357,837 | 11/1982 | Beardmore | 74/5 F |
| 4,380,108 | 4/1983 | Craig | 74/5.46 X |

*Primary Examiner*—Rodney H. Bonck
*Attorney, Agent, or Firm*—Morris Liss; Thomas W. Kennedy

[57] ABSTRACT

The torquer section of a gyro includes a plurality of torquer coils symmetrically positioned within a flywheel. A pair of parallel spaced radially oriented salient torquer magnets are located within the flywheel and are equidistant to each respective coil. The magnet pairs increase the flux density within the operating gap between coil and magnets while minimizing fringing flux. The torquer section is secured to the gryoscope housing by mounting materials which reduce unwanted thermal gradients during rapid warmup and high torquing rates thus virtually ensuring consistent torquer coil position over the operating temperature range.

4 Claims, 3 Drawing Figures

FLEXURE SUSPENDED GYRO UTILIZING DUAL SALIENT POLE MAGNETS

BACKGROUND OF THE INVENTION

The field of the invention relates to gyroscopes and more particularly to two-axis, flexure suspended gyroscopes.

A prior art gyroscope (gyro) configuration to which the present invention relates is shown in FIG. 1. In the illustrated arrangement the gyro torquer comprises a flywheel 1 which encloses a single radially oriented magnet 2. A shield plate 3, which acts as a pickoff return path, partially closes the open end of the flywheel. This type of wheel can be made to have a relatively low inertia and can be torqued at high rates. However, its disadvantages are: it has relatively high torquer non-linearity errors, high hysteresis errors and high bias instability.

Non-linearity errors are mainly caused by the magnetic field generated by the current flowing through the torquer coil 4 which tends to drive the coil within the wheel. This force, called the solenoid force, is defined by the equation $F = K (NI)^2 dP/d\theta$ where N is the number of turns in the coil, I the current, and $dP/d\theta$ is the change in the permeability of the coil relative to the wheel as a function of angle. The magnetic permeance to the torquer coil is high in this design because of the shield.

Hysteresis errors are caused by high levels of torquer coil current which magnetize some magnetic impurities in the coil cement, wire or support form 5. Some of this magnetization remains, even with no current flowing through the coil, and reacts with the flux from the magnet to cause a torque. In this design configuration there is an inherently greater field intensity near the magnet and shields which increases the torque, as compared with a balanced condition of field intensity.

The bias instability is due to the magnetic coupling between the torquer coil 4 and pickoff coil 4a. Part of the field 7 generated by the torquer coil section 6 passes through the wheel return path and through the pickoff poles 7a. This can cause a change in pickoff null as well as a hysteresis error.

BRIEF DESCRIPTION OF THE INVENTION

In the present invention, the flywheel houses dual radially oriented and parallel spaced magnet assemblies which result in a higher flux density within the operating gap and lower fringing flux. The shaped magnets also increase the flux density within the operating gap. By using a dual torquer magnet, the apparent gap between a torquing coil and each of its corresponding magnets is one half the total gap and the fringing flux pattern is symmetrical with the center of the torquing coil. Because of this symmetry, hysteresis torques due to impurity particles magnetized by the coil current and interacting with the magnet field are reduced. This is based on the probability that magnetic particles will be symmetrically distributed and the attraction to the inner magnet will be opposed by the attraction to the outer magnet. Also, due to the lower fringing flux there is no need for a magnetic shield and flywheel ends can be open and substantially cover the torquer coil so that the solenoid force can be substantially reduced.

The flywheel is inverted which completely isolates and shields the pickoff from the torquer coils. This completely eliminates this source of hysteresis error and gyro restraint instability.

Also, by using a dual magnet and an open flywheel, the clearances between the torquer coil and flywheel is large, other than in the magnet area. Since the magnets are close to the axial center, torques as a result of flywheel tilt are reduced.

The above-mentioned objects and advantages of the present invention will be more clearly understood when considered in conjunction with the accompanying drawings, in which:

DETAILED DESCRIPTION OF THE PRESENT INVENTION

Figure 1:
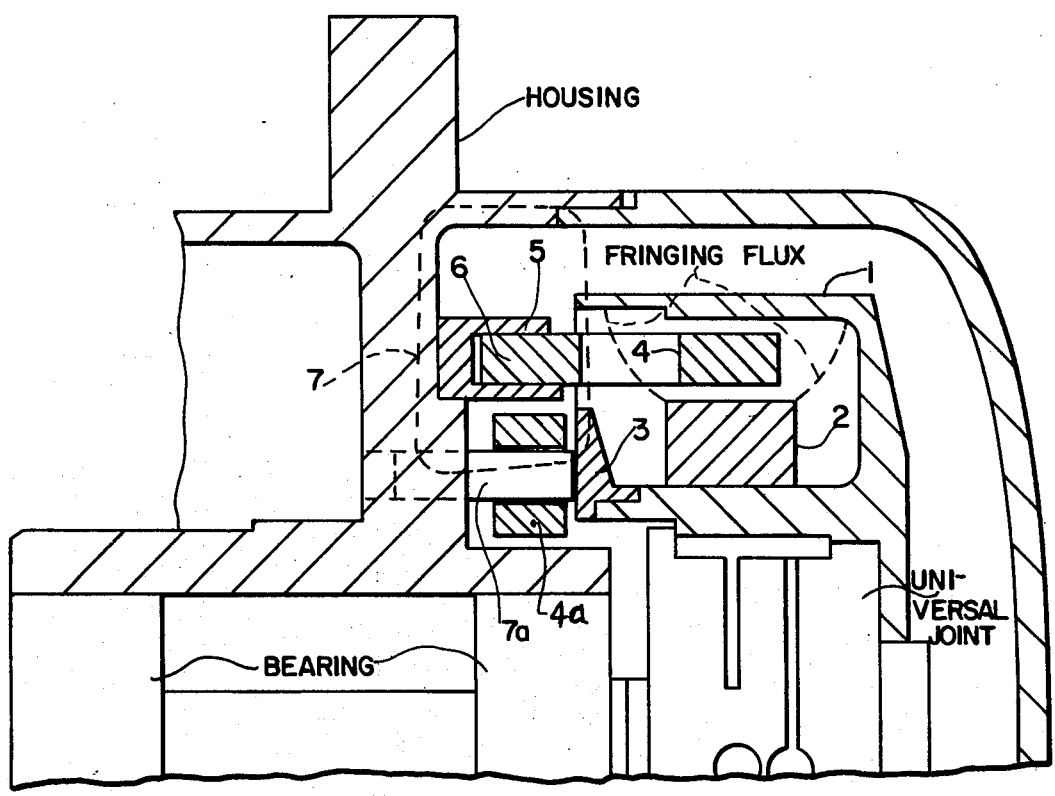
FIG. 1 is a partial sectional view illustrating the torquing section of a prior art flexure suspended gyroscope.
Figure 3:
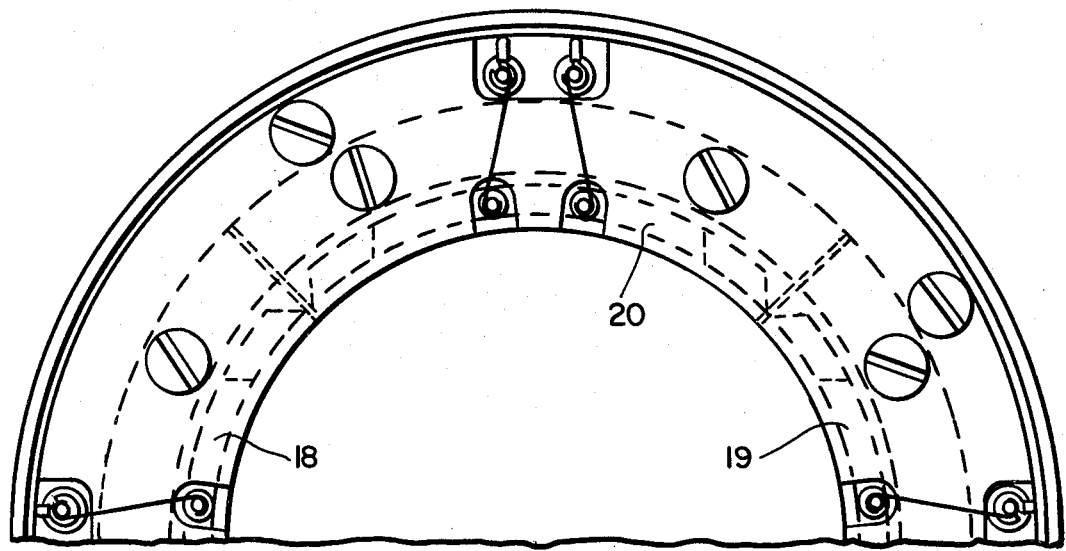
FIG. 3 is a partial plan view of a torquer coil assembly utilized in the present invention.
Figure 2:
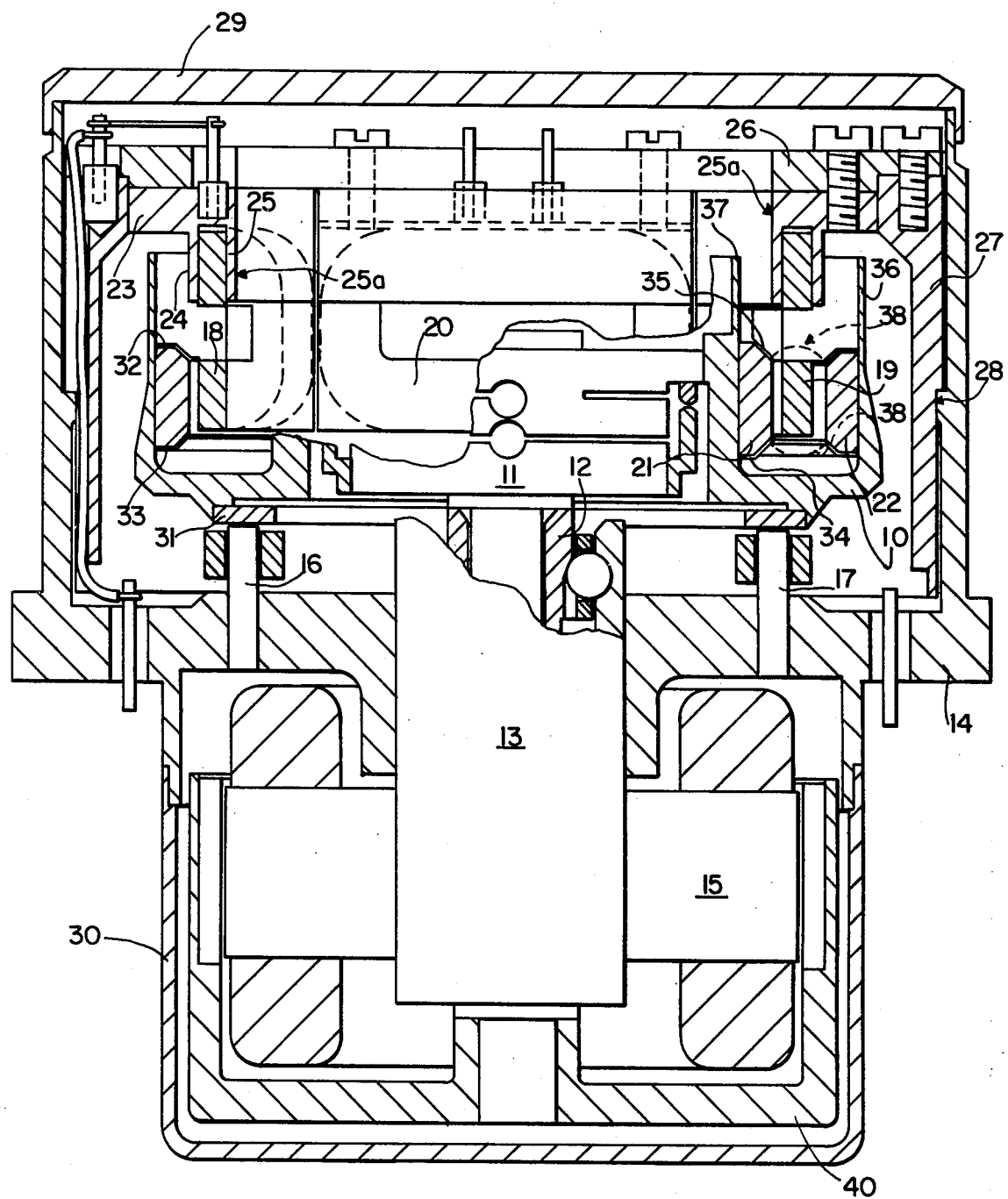
FIG. 2 is a cross-sectional view of the present gyroscope.

Referring to FIG. 2, the gyro consists of a flywheel 10 made of a highly permeable magnetic material which supports and encloses two radially oriented torquer ring magnets 21 and 22 and to which is attached a pickoff plate 31. Flywheel 10 is attached to a universal hinge assembly 11 that is attached to a bearing shaft 12 which rotates between a pair of bearings 13 mounted in housing 14. A stator assembly 15 drives the flywheel up to a controlled speed through rotor 40. Four pickoff poles, spaced at 90 degrees, two of which are shown (16 and 17), sense the angular tilt. There are four torquer coils, spaced at 90 degrees, three of which are shown (18, 19 and 20), which when energized by current provide a controlled torque to keep the pickoff poles aligned.

Each torquer coil (18, 19 and 20) is cemented to individual partial rings 23, at sections 24 and 25, and preferably potted to obtain a uniform assembly. The individual coil assemblies 25a are mounted to a plate 26 which is in turn mounted to a support ring 27, which is in turn mounted to housing 14 at section 28. These parts 23, 26 and 27 are made of a non-magnetic material with high thermal conductivity like copper. A small clearance exists between ring 27 and housing 14. The section 28 is nominally coplanar with the axial center of dual ring magnets 21 and 22.

The gyro is sealed by covers 29 and 30. These covers and housing 14 are preferably made of a high permeability magnetic material.

Torquer magnets 21 and 22 are preferably shaped to obtain the maximum flux density within the operating gap between the torquer coils and their corresponding magnets. Rings 32, 33, 34 and 35 are magnetically thermally sensitive and compensate for the drop in flux density of the magnets with increase in temperature.

Sections 36 and 37 of flywheel 10, extend well beyond the magnets to contain the fringing flux from the magnets and also to substantially reduce "solenoid force".

The torquer coil assembly 25a has four individual and removable segments as compared to a one-piece solid molded cylindrical assembly used in previous methods. This allows impedance matching, adjustment for alignment, and selection for optimum characteristics.

The wheel and torquer are enclosed by the ring 27 and plate 26 which reduce the thermal gradients that occur from quick warmup and high torquing rates. Ring 27 is attached to the housing in a plane which cuts through the torquer magnet center. This ensures that the torquer coil position does not change as a result of temperature if the support ring is made from copper, the same as the coil.

There are variations which can be made which include some portions of the features described. For example, in a low cost version where the performance is not as important, an inverted wheel using a single magnet could be used. In a version like this the pickoff plate could be eliminated using the face of the torquer wheel as a return path.

Also, a version can be made which includes a dual magnet, with the torquer and pickoff on the same side.

Also, the torquer assembly can be made without the four separate segments, but mounted to a common ring.

The advantages of this invention over the prior art are summarized as follows:

The flywheel houses dual radially oriented parallel spaced ring magnets 21 and 22 which results in a higher flux density within the operating gap and a lower fringing flux. The shaped magnets also increase the flux density within the operating gap.

By using a dual magnet, the apparent gap to each magnet is one-half the total gap and the fringing flux pattern is symmetrical with the center of the coil, as shown in FIG. 2, reference numeral 38. Because of this symmetry, hysteresis torques due to impurity particles magnetized by the coil current and interacting with the magnet field are reduced. This is based on the probability that magnetic particles will be symmetrically distributed and the attraction to the inner magnet will be opposed by the attraction to the outer magnet. Also, due to the lower fringing flux there is no need for a magnetic shield and flywheel ends can be open and substantially cover the torquer coil so that the solenoid force can be substantially reduced.

The flywheel is inverted which completely isolates and shields the pickoff from the torquer coils. This completely eliminates this source of hysteresis error and gyro restraint instability.

Also, by using a dual magnet and an open flywheel, the clearance between the torquer coil and flywheel is large, other than in the magnet area. Since the magnets are close to the axial center, torques as a result of flywheel tilt are reduced.

It should be understood that the invention is not limited to the exact details of construction shown and described herein for obvious modifications will occur to persons skilled in the art.

We claim:

1. A flexure suspended gyroscope comprising:
a housing having a stator and rotor assembly and having a pair of bearings and having a bearing shaft with a common axis;
a universal hinge assembly supported by the bearing shaft coaxially therewith;
an open-ended flywheel located in the housing and supported by the universal hinge assembly coaxially therewith;
a plurality of torquer coils symmetrically positioned within the flywheel forming a ring-shaped torquer coil assembly disposed coaxially therewith;
a plurality of pairs of parallel spaced radially oriented torquer magnets located within the flywheel, forming two ring shaped torquer magnet assemblies disposed coaxially therewith, each pair of torquer magnets being equidistant to each respective torquer coil; and
mounting means for mounting the torquer coils to the housing for virtually ensuring that the torquer coils are not axially displaced relative to the flywheel and torquer magnets as a result of change of temperature; and
pickoff means including a plurality of pickoff poles for sensing gyroscope angular tilt; wherein
the flywheel has a closed end which is disposed adjacent to the pickoff means and is disposed between the pickoff means and the torquer coils thereby isolating the torquer coils from the pickoff means; wherein
the mounting means includes a plate and ring portion which is fabricated from a metal which minimizes the thermal gradients that occur from rapid gyroscope warmup and torquing rates; and wherein
the torquer magnets are saliently shaped for maximizing the flux density within the gap between the magnets and a respective coil, while minimizing fringing flux; and wherein
each torquer magnet has a pair of axially-spaced rings which are magnetically thermally sensitive in order to compensate for the drop in flux density of the magnets with increase in temperature.

2. The gyroscope as set forth in claim 1, wherein the flywheel has a pair of ring-shaped flange sections extending in an axially outward direction beyond the torquer magnets in order to reduce torquer coil solenoid force thereby minimizing torquer non-linearity error.

3. The gyroscope set forth in claim 2, wherein the torquer coils are four individual and removable segments, thereby allowing their impedance matching, adjustment for alignment, and selection for optimum characteristics.

4. The gyroscope set forth in claim 3, wherein the torquer coil mounting plate and ring portion has an L-shaped cross-section and includes a radially extending plate portion and an axially extending ring portion, said ring portion having an attachment section, said attachment section being adapted to attach to the housing, said attachment section being disposed in a radially extending plane which substantially includes the torquer magnet center thereby minimizing the change of position in an axial direction of the torquer coil relative to the torquer magnet center due to temperature change.

* * * * *